United States Patent
Avakian

(10) Patent No.: US 11,001,049 B2
(45) Date of Patent: *May 11, 2021

(54) SUPPORT MATERIAL FOR 3D PRINTING OF POLYMER COMPOUNDS

(71) Applicant: PolyOne Corporation, Avon Lake, OH (US)

(72) Inventor: Roger W. Avakian, Solon, OH (US)

(73) Assignee: Avient Corporation, Avon Lake, OH (US)

( * ) Notice: Subject to any disclaimer, the term of this patent is extended or adjusted under 35 U.S.C. 154(b) by 401 days.

This patent is subject to a terminal disclaimer.

(21) Appl. No.: 15/542,357

(22) PCT Filed: Jan. 11, 2016

(86) PCT No.: PCT/US2016/012897
§ 371 (c)(1),
(2) Date: Jul. 7, 2017

(87) PCT Pub. No.: WO2016/115046
PCT Pub. Date: Jul. 21, 2016

(65) Prior Publication Data
US 2019/0001569 A1      Jan. 3, 2019

Related U.S. Application Data

(60) Provisional application No. 62/102,198, filed on Jan. 12, 2015.

(51) Int. Cl.
*B33Y 80/00* (2015.01)

(52) U.S. Cl.
CPC ....... *B33Y 80/00* (2014.12); *Y10T 428/24802* (2015.01)

(58) Field of Classification Search
CPC ...... C08F 232/08; C08F 210/02; C08L 45/00; C08L 23/0823; C08L 2201/08; B33Y 80/00; Y10T 428/24802
USPC .................................................... 428/195.1
See application file for complete search history.

(56) References Cited

U.S. PATENT DOCUMENTS

| | | | |
|---|---|---|---|
| 5,723,545 A | 3/1998 | Harrington et al. | |
| 5,763,532 A | 6/1998 | Harrington et al. | |
| 5,837,787 A | 11/1998 | Harrington | |
| 6,121,383 A | 9/2000 | Abdou-Sabet et al. | |
| 8,148,472 B1 | 4/2012 | Baugh et al. | |
| 8,344,070 B2 | 1/2013 | Squire et al. | |
| 8,519,056 B2 | 8/2013 | Baugh et al. | |
| 9,227,366 B2 | 1/2016 | Giller | |
| 9,785,064 B2 | 10/2017 | Orrock et al. | |
| 9,862,146 B2 | 1/2018 | Driessen et al. | |
| 2002/0017743 A1 | 2/2002 | Priedeman, Jr. | |
| 2003/0004600 A1 | 1/2003 | Priedeman, Jr. | |
| 2004/0222561 A1 | 11/2004 | Hopkins | |
| 2005/0014898 A1 | 1/2005 | Kanai | |
| 2005/0040564 A1 | 2/2005 | Oliver et al. | |
| 2010/0096072 A1 | 4/2010 | Hopkins et al. | |
| 2011/0256373 A1 | 10/2011 | Tartarka et al. | |
| 2014/0353197 A1 | 12/2014 | Hu et al. | |
| 2016/0253584 A1* | 9/2016 | Fodor | C12Q 1/6813 235/494 |

FOREIGN PATENT DOCUMENTS

WO    WO0069930    11/2000

OTHER PUBLICATIONS

Dorigato et al. "Linear Low Density Polyethylene/Cycloolefin Copolymer Blends" eXPRESS Polymer Letters vol. 5, Issue 1, pp. 23-37 (2011).
Khanarian, "Rubber Toughened and Optically Transparent Blends of Cyclic Olefin Copolymers" Polymer Engineering and Science vol. 40 No. 12 pp. 2590-2601 (2000).
Khonakdar et al., "Miscibility Analysis, Viscoelastic Properties and Morphology of Cyclic Olefin Copolymer/Polyolefin Elastomer (COC/POE) Blends" Composites Part B 2015 vol. 69 pp. 111-119 (2014).
Millsaps, "The Fluidic Factory Is the First Commercial 3D Printer for Fabricating Microfluidic Chips & More" (3D Print.com Mar. 2016).
Sticker et al., "Rubber Toughened Cycloolefin Copolymers" Die Angewandte Makromolekulare Chemie vol. 256 Issue 1 pp. 101-104 (1998).
Topas, "Cyclic Olefin Copolymer" Brochure (2011).
Tartarka, "Modified Cyclic Olefin Copolymers as New Cost and Sustainability Tool for Multilayer Packaging Films" SPE Presentation by Topas Advanced Polymers (2011).
Topas, "Technical Data Sheet for 6017S-04" (2014).
Zeon, "Zeonor Cyclic Olefin Polymer" Brochure (2014).

* cited by examiner

*Primary Examiner* — Betelhem Shewareged
(74) *Attorney, Agent, or Firm* — John H. Hornickel; Emily E. Vlasek

(57) ABSTRACT

Cyclic olefin copolymer (COC) and cyclic olefin polymer (COP) are useful as support material for 3D printing of high temperature polymers, such as polyimides.

20 Claims, No Drawings

SUPPORT MATERIAL FOR 3D PRINTING OF POLYMER COMPOUNDS

CLAIM OF PRIORITY

This application claims priority from U.S. Provisional Patent Application Ser. No. 62/102,198 filed on Jan. 12, 2015, which is incorporated by reference.

FIELD OF THE INVENTION

This invention concerns certain polymeric materials useful to support a polymer article made by 3D Printing, alternatively known as Fused Deposition Modeling or Additive Manufacturing.

BACKGROUND OF THE INVENTION 3D printing of polymer compounds into desired three dimensional shapes uses a thermoplastic material ("build material") which sometimes is self-supporting during deposition of each layer of build material. However, often because of the intricacy of the final three dimensional shape desired, the build material needs support during formation, much as scaffolding is used during construction of a building and then removed after construction is completed. That support material needs to be made of a different thermoplastic material than the build material and is used to maintain the three dimensional integrity of the build material while under construction until cooling of the build material occurs sufficiently for the article to be self-supporting. After cooling to room temperature the scaffolding of the support material can then be removed from the build material now sturdy and self-supporting in its final three dimensional shape.

Previously, polymeric support materials have been chosen based on their solubility in certain solvents, whether aqueous or organic, to dissolve away from the support material from the build material in its final three dimensional shape. Finding suitable solvents in which build material does not dissolve, but support material does, is one problem which limits choice of both types of material. Also, processing of solvent after use is another problem.

SUMMARY OF THE INVENTION

What is desired is a support material which has sufficient melt strength to support the build material during construction via 3D Printing but also which "breaks away" at room temperature from the build material because of lack of adhesion of the support material to the build material and/or because of differences in coefficient of thermal expansion (CTE) properties between the build material and the support material.

Moreover, the support material needs to have proper rheological properties, such that the support material has a viscosity vs. shear rate similar to the build material and also sufficient melt strength so that it supports the build material and does not simply flow away from the support material during construction via 3D printing.

Finding a suitable polymer as a support material for 3D printing of polyetherimide and polyetherimide/polycarbonate blends depends on a polymer with an appropriate viscosity vs. shear rate at the same temperature that polyetherimides and polyetherimide/polycarbonate blends process is one constraint. But that constraint is important only for construction of the scaffolding to serve to support the build material. A different constraint is that the support material must be able to easily and completely debond from these build materials after 3D printing is completed.

Other considerations for selection of a support material are that they must have adequate thermal stability and not contaminate the build material as they flow and build layer-upon-layer into a final three dimensional shape.

Addressing these constraints and considerations, it has been found that cyclic olefin copolymer (COC) and cyclic olefin polymer (COP) meet the requirements identified above to serve as the support material for 3D printing of polyetherimides and polyetherimide/polycarbonate blends as build materials.

Both COC and COP (a) have sufficient melt strength at the processing temperature range of polyetherimide (PEI) and polyetherimide/polycarbonate blends (PEI/PC) to build a good scaffold, (b) have good debonding behavior at room temperature from the PEI or PEI/PC, and (c) can be impact modified, if needed, to have sufficient ductility for spooling when 3D Printing uses machines which deliver strands of support material from a spool.

Additionally, COC and COP are inherently clear and hence can be colored or rendered fluorescent or identified by some other marker (radio-opaque, Near Infrared pigment, metal, etc.) to help distinguish the support material from the build material when it is time to remove all support material from the build material.

COC and COP are sold in various molecular weights and hence have a robust product range to provide melt viscosities to be suitable for use with PEI or PEI/PC or other desired polymeric build materials.

These polymers are also thermally stable and do not depolymerize readily.

Moreover, using COC or COP as a support material establishes a debonding mechanism of support material from build material which is not reliant on an additive, such as silicone, that could render the build material unsuitable for subsequent adhesive bonding or painting.

EMBODIMENTS OF THE INVENTION

Support Material

Cyclic olefin copolymer (COC) can refer to copolymers of cyclic olefin monomers, such as norbornene or tetracyclododecene, with ethene or other alkenes. The most common COC is ethylene-norbornene copolymer which has a CAS No. of 26007-43-2 and the following structure:

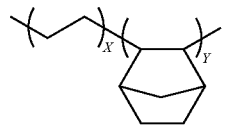

wherein X ranges from about 40 wt. % to about 20 wt. % and preferably from about 25 wt. % to about 18 wt. % and wherein Y ranges from about 60 wt. % to about 80 wt. % and preferably from about 75 wt. % to about 82 wt. %.

Any COC is a candidate for use in the invention as a support material because it is commercially available arising from its use as a polymer resin for high temperature thermoplastic compounds.

COC should have a weight average molecular weight (Mw) ranging from about 40,000 to about 130,000 and preferably from about 93,000 to about 125,000. COC should have a heat deflection temperature ranging from about 30°

C. to about 170° C. and preferably from about 75° C. to about 170° C. at 0.45 MPa (66 psi load).

Commercially available COC is sold by TOPAS Advanced Polymers using the TOPAS® brand. Of the commercial grades available, TOPAS® 6017S-04 COC, an injection molding grade, is presently preferred because it has the highest heat deflection temperature within the TOPAS product family Its Vicat softening temperature B50 (50° C./h 50N) is 178° C. as tested using the procedure of ISO 306. Also, its degree of light transmission is 91% as tested using the procedure of ISO 13468-2. Its tensile modulus (1 mm/min) is 3000 MPa as tested using the procedure of ISO 527-2/1A.

Other desirable attributes for the COC are a polymer with low amounts of oligomers which could volatilize or plasticize the build material and a polymer which is non-polar so that the support material has very little adhesive attraction to build materials made of polar polymers such as PEI and PEI/PC.

Cyclic olefin polymer (COP) can refer to polymers which have undergone ring-opening metathesis polymerization from various cyclic monomers followed by hydrogenation. The cyclic monomers can be norbornene or tetracyclododecene, as with COC.

Any COP is a candidate for use in the invention as a support material because it is also commercially available arising from its use as a polymer resin for high temperature thermoplastic compounds.

COP should have a weight average molecular weight (Mw) ranging from about 30,000 to about 170,000 and preferably from about 45,000 to about 133,000. COP should have a heat deflection temperature ranging from about 75° C. to about 170° C. and preferably from about 120° C. to about 170° C. at 0.45 MPa (66 psi load).

Commercially available COP is sold by Zeon Chemical using the ZEONO® brand. Of the commercial grades available, ZEONO® 1020R or 1060R COP grades are presently preferred because they have a heat deflection temperature of 101° C. and 99° C., respectively, as tested using the procedure of ASTM D648 under 1.80 MPa conditions. Also, both have a degree of light transmission of 92% as tested using the procedure of ASTM D1003 under 3 mm thickness conditions. Their respective tensile moduli are 2200 and 2100 MPa as tested using the procedure of ISO 527.

Other desirable attributes for the COP are the same as those for COC, namely a polymer with low amounts of oligomers which could volatilize or plasticize the build material and a polymer which is non-polar so that the support material has very little adhesive attraction to build materials made of polar polymers such as PEI and PEI/PC.

Optional Additives to Support Material

The compound of the present invention can include conventional plastics additives in an amount that is sufficient to obtain a desired processing or performance property for the compound. The amount should not be wasteful of the additive or detrimental to the processing or performance of the compound. Those skilled in the art of thermoplastics compounding, without undue experimentation but with reference to such treatises as *Plastics Additives Database* (2004) from Plastics Design Library (elsevier.com), can select from many different types of additives for inclusion into the compounds of the present invention.

For support material for 3D printing, non-limiting examples of optional additives include optical brighteners, impact modifiers, and process aids, rheology modifiers, thermal and UV stabilizers, fluorescent and non-fluorescent dyes and pigments, radio-opaque tracers, conductive additives (both thermal and electrical), inductive heating additives and non-silicone releases; and combinations of them.

Processing

To the extent that COC or COP polymer resin is to be used as support material for 3D printing without use of optional additives, processing is not needed. But if optional additives are used, then processing of the polymer resin into polymer compound is needed, either in batch or continuous operations.

Mixing in a continuous process typically occurs in an extruder that is elevated to a temperature that is sufficient to melt the polymer matrix with addition either at the head of the extruder or downstream in the extruder of the solid ingredient additives. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives. The mixing speeds range from 60 to 1000 rpm and temperature of mixing can be ambient. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com), one can make articles of any conceivable shape and appearance using compounds of the present invention.

For use as a support material, the polymer resin or the polymer compound emerges from the extruder as a strand of a length ranging from about 0.137 m (0.25 ft.) to about 1.82 m (6 ft.) and preferably from about 0.60 to about 0.91 m (about 2 ft. to about 3 ft). Longer strands can be coiled on to a spool for easier dispensing at the 3D printer.

Usefulness of the Invention 3D printing is already transforming manufacturing operations using polymers. 3D printing moves beyond the traditional extrusion, molding, sheeting, calendering, and thermoforming techniques, because of the ability of 3D printing in all three dimensions to form in one operation any final-shape polymer article.

3D printing is finding markets of usage ranging from desktop machines for the individual to prototyping machines for the product developer to the production machines to form three dimensional objects which are difficult to produce via traditional molding, casting, or other shaping techniques. Unlike other techniques which provide a preliminary shape, followed by subtraction of material to reach the final shape, 3D printing is truly manufacturing by a one operation additive process.

Whenever a final shape might be incapable of self-supporting itself during three dimensional material, use of support material is needed. The support material is delivered to the 3D printer at the same time as the build material. Much like the lost wax metal casting process, the support material is then removed leaving the build material in its final shape. The means of removal conventionally has been salvation, as explained above.

Whenever the polymer to be 3D printed contains a high temperature polymer such as polyimide, COC or COP as a polymer resin or in a polymer compound can be a very suitable support material for use to provide scaffolding for a polyimide-containing build material. The differences in coefficient of thermal expansion permit convenient and facile debonding of the support material from the build material now in its final shape as a polymer article.

EXAMPLES

Two formulations of support material were prepared. Example 1 was 99 wt. % of TOPAS 6017S COC and 1 wt. % Optical Brightener (Eastobrite™ OB-1 from Eastman Chemical Company). Example 2 was 96 wt. % of TOPAS 6017S COC; 1 wt. % of the same Optical Brightener; and 3 wt. % of Kraton G1651 styrenic block copolymer from Kraton, serving as an impact modifier.

Both Examples were compounded and extruded using a 16 mm twin screw extruder 40:1 L/D Thermo electron, set at 270-280° C. and 300 rpm, and having a torque of 56-65%. The extrudate was pelletized.

Pellets of both Examples were then molded using a 120 T (ton) Van Dorn molding machine with a 1.6 mm flexural test bar mold. The molding conditions were a temperature of 270-280° C. and a screw speed of 100-150 rpm. The injection velocity was 0.5-1.0 in/sec, with a pack and hold pressure of 3.44 MPa (500 psi) for 5-6 sec, a back pressure 0.17-0.34 MPa (25-50 psi), a mold temperature of 150-160° C., and a cool time of 15-20 seconds.

To test Examples 1 and 2 for lack of adhesion with polyetherimide polymer resin (Ultem® 9085 from SABIC), a special test method was used.

Test Method for Determining Polymer/Polymer Lack of Adhesion or "Debonding" after Compression Molding 1. One previously injection molded 1.6 mm thick ASTM Izod bar of the Example was placed on top of a previously injection molded 1.6 mm thick ASTM Izod bar of Ultem® 9085 polyetherimide inside a 3.2 mm thick "MUD frame" which is the term used for a Master Unit Die mold, e.g. a 3.2 mm thick metal frame with cut-outs for the injection molded ASTM Izod specimens. On either side of the cut-out is solid metal. The MUD frame helped to secure the two bars together surface to surface and minimized "flashing" or movement of molten polymer away from the compressed areas of the bars.

2. The compression mold was heated to a temperature of 230-235° C.

3. The MUD frame with the overlapping bars was placed into compression unit; the MUD frame was pre-heated for about 30 seconds.

4. The compression pressure upon the MUD frame containing the two bars was increased up to about 6.2 MPa (900 psi) and held for two minutes.

5. The pressure was relieved and the MUD frame removed from the compression press.

6. After the MUD frame cooled to room temperature, the two bars were removed from the MUD frame.

7. The two bars were tested for their adhesive strength.

Many times the build and support materials debonded on their own, upon cooling.

Test Results

The test bar of Example 1 had more adhesive strength to the Ultem®9085 test bar than the test bar of Example 2. However, both bars of Examples 1 and 2 were sufficiently debonded from the Ultem® 9085 test bar as to be acceptable as support material for polyetherimide containing resins or compounds as a build material. Of the two, Example 2 was preferred because it had less adhesive strength to the Ultem® 9085 test bar than Example 1.

Also, Example 2 was chosen over Example 1 because it exhibited more ductility when wound onto a ~7.6 (~3 inch) spool. Example 1 would tend to break while spooling but could be used as cut strands.

The ductility exhibited by Example 2 was desired for spooling lengths of the support material.

In further experimentation comparing COC with COP, it was noted that TOPAS® COC was preferred over Zeonor® COP because the TOPAS® COC caused less "flash" during the adhesion test.

The invention is not limited to the above embodiments. The claims follow.

What is claimed is:

1. A scaffold built by a support material during 3D polyimide printing comprising cyclic olefin copolymer or cyclic olefin polymer.

2. The scaffold of claim 1, wherein the cyclic olefin copolymer (COC) is a copolymer of cyclic olefin monomers with alkenes.

3. The scaffold of claim 2, wherein the cyclic olefin copolymer is ethylene-norbornene copolymer.

4. The scaffold of claim 3, wherein the ethylene-norbornene copolymer has the following structure:

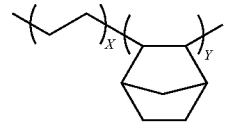

wherein X ranges from about 40 wt. % to about 20 wt. % and wherein Y ranges from about 60 wt. % to about 80 wt. %.

5. The scaffold of claim 3, wherein the ethylene-norbornene copolymer has the following structure:

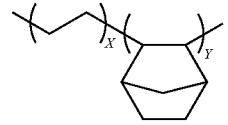

wherein X ranges from about 25 wt. % to about 18 wt. % and wherein Y ranges from about 75 wt. % to about 82 wt. %.

6. The scaffold of claim 3, wherein the cyclic olefin copolymer has a weight average molecular weight (Mw) ranging from about 40,000 to about 130,000, a heat deflection temperature ranging from about 30° C. to about 170° C. at 0.45 MPa (66 psi load).

7. The scaffold of claim 1, wherein the cyclic olefin polymer (COP) are polymers which have undergone ring-opening metathesis polymerization from cyclic monomers followed by hydrogenation, wherein the cyclic monomers comprise norbornene or tetracyclododecene.

8. The scaffold of claim 1, wherein the scaffold further comprises optical brighteners, impact modifiers, process aids, rheology modifiers, thermal and UV stabilizers, fluorescent and non-fluorescent dyes and pigments, radio-opaque tracers, conductive additives (both thermal and electrical), inductive heating additives, non-silicone releases; and combinations of them.

9. The scaffold of claim 1, wherein the scaffold also comprises styrenic block copolymer as an impact modifier for the scaffold.

10. A 3D printed polymer article comprising polyimide as a build material and the support material of claim 1.

11. The 3D printed polymer article of claim 10, wherein the support material further comprises optical brighteners, impact modifiers, process aids, rheology modifiers, thermal and UV stabilizers, fluorescent and non-fluorescent dyes and pigments, radio-opaque tracers, conductive additives (both thermal and electrical), inductive heating additives, and non-silicone releases; and combinations of them.

12. The support material of claim 11, wherein the support material also comprises styrenic block copolymer as an impact modifier for the support material.

13. A method of using the support material of claim 1, comprising the steps of 3D printing both polyimide as a build material and the support material of claim 1.

14. The method of claim 13, wherein the support material further comprises optical brighteners, impact modifiers, process aids, rheology modifiers, thermal and UV stabilizers, fluorescent and non-fluorescent dyes and pigments, radio-opaque tracers, conductive additives (both thermal and electrical), inductive heating additives, and non-silicone releases; and combinations of them.

15. The method of claim 14, wherein the support material also comprises styrenic block copolymer as an impact modifier for the support material.

16. A 3D printed polymer article comprising polyimide as a build material and the support material of claim 2.

17. A 3D printed polymer article comprising polyimide as a build material and the support material of claim 3.

18. A 3D printed polymer article comprising polyimide as a build material and the support material of claim 4.

19. The 3D printed polymer article of claim 18, wherein the support material further comprises optical brighteners, impact modifiers, process aids, rheology modifiers, thermal and UV stabilizers, fluorescent and non-fluorescent dyes and pigments, radio-opaque tracers, conductive additives (both thermal and electrical), inductive heating additives, and non-silicone releases; and combinations of them.

20. The support material of claim 18, wherein the support material also comprises styrenic block copolymer as an impact modifier for the support material.

\* \* \* \* \*